United States Patent
Takagawa et al.

[11] Patent Number: 5,987,612
[45] Date of Patent: Nov. 16, 1999

[54] INTERNET ACCESSING SYSTEM USING CARD READERS AND DUAL CARDS WITH INFORMATION PERTAINING TO LOG ON

[75] Inventors: Yuichiro Takagawa, Tokyo; Ken-ichiro Shimokura, Kitatsuru-gun; Yoshihiko Shiraishi, Tokyo, all of Japan; Satoshi Iwata, Boston, Mass.

[73] Assignee: Nippon Telegraph and Telephone Corporation, Japan

[21] Appl. No.: 08/982,603

[22] Filed: Dec. 2, 1997

[30] Foreign Application Priority Data

Dec. 6, 1996 [JP] Japan .................................. 8-327318

[51] Int. Cl.⁶ ........................................................ G06F 7/00
[52] U.S. Cl. ............................................. 713/201; 709/219
[58] Field of Search ................................... 713/200–202; 709/217–219, 227, 229

[56] References Cited

U.S. PATENT DOCUMENTS

| | | | |
|---|---|---|---|
| 4,634,848 | 1/1987 | Shinohara et al. | 235/449 |
| 5,434,398 | 7/1995 | Goldberg | 235/380 |
| 5,574,269 | 11/1996 | Mori et al. | 235/380 |
| 5,666,412 | 9/1997 | Handelman et al. | 380/4 |
| 5,732,137 | 3/1998 | Aziz | 380/25 |
| 5,749,075 | 5/1998 | Toader et al. | 705/14 |
| 5,784,555 | 7/1998 | Stone | 395/200.5 |
| 5,794,230 | 8/1998 | Horadan et al. | 707/2 |
| 5,801,750 | 9/1998 | Kurihara | 348/7 |
| 5,802,304 | 9/1998 | Stone | 395/200.57 |
| 5,805,803 | 9/1998 | Birrell et al. | 395/187.01 |
| 5,812,765 | 9/1998 | Curtis | 395/200.3 |
| 5,812,819 | 9/1998 | Rodwin et al. | 395/500 |
| 5,881,226 | 3/1999 | Veneklase | 395/188.01 |
| 5,889,941 | 3/1999 | Tushie et al. | 395/186 |
| 5,898,835 | 4/1999 | Truong | 395/200.47 |

FOREIGN PATENT DOCUMENTS 0 706 291 A2  4/1996  European Pat. Off. .
8-214278  8/1996  Japan .

*Primary Examiner*—Glenn A. Auve
*Assistant Examiner*—Jigar Pancholi
*Attorney, Agent, or Firm*—Pennie & Edmonds LLP

[57] ABSTRACT

An Internet accessing system which allows automatic user login onto the Internet with the use of two cards and card readers. One card contains information about an Internet access point telephone number, the ID number of the user, and the password of the user. The second card contains information about the URL designating the location of the desired startup homepage. Upon insertion of the cards into the card readers, the user is automatically logged onto the Internet.

19 Claims, 12 Drawing Sheets

5,987,612

INTERNET ACCESSING SYSTEM USING CARD READERS AND DUAL CARDS WITH INFORMATION PERTAINING TO LOG ON

BACKGROUND OF THE INVENTION

1. Technical Field of the Invention

The present invention relates to an Internet accessing apparatus and system thereof which allows an user to connect to a computer communication network, represented by the Internet, by means of utilizing information storage cards such as IC cards and magnetic cards, and the information recorded on those cards, and to receive multimedia information.

This application is based on patent application No. Hei 8-327318 filed in Japan, the content of which is incorporated herein by reference.

2. Description of the Related Art

A conventional method of connecting to a computer communication network, represented by the Internet, and of receiving multimedia information will be explained with reference to FIG. 12. First, the hardware consisting a personal computer 2 is equipped. A connection program 4 to connect, by a method known as dialup, to a WWW (World Wide Web) server 6 provided at an access point via a communication line 1 such as a telephone line or an ISDN line, and a program 5 known as a browser for accessing the multimedia information publicly available on the Internet 7, and for receiving and displaying those information are loaded onto the above personal computer 2. In addition, there is a need to equip a system which is connected with a communication interface 3 such a modem or a terminal adapter. According to this system, connecting and obtaining information is executed by the following procedures.

(1) activate connection program 5 and originate a call to the access point 6. Execute procedures (entering user ID, verifying password, etc.) to connect to the Internet 7.

(2) Activate browser program 5, connect to the Internet 7, access to multimedia information such as homepages, and select and receive desired information.

With the above system, it is necessary for the user to perform the initial settings in these programs with respect to communication over a network. In addition, in step (1), it is necessary to activate the connection program, set the telephone number of the connection site, and input the user ID and password when connecting. Furthermore, in step (2), it is necessary to activate another program and to enter a URL (Uniform Resource Locator) designating the access site of the multimedia information, also known as a tag, before accessing the information.

With the above described conventional method, it is necessary for the user to perform a number of burdensome steps requiring settings before obtaining the actual information. It is extremely difficult for an user, who is not experienced with computers and computer communication networks, to access the Internet smoothly, even if the user had interest in the Internet.

SUMMARY OF THE INVENTION

The objective of the: present invention is to offer an Internet accessing apparatus and system thereof, which italicizes an information storage card, and which automatically executes a series of processes from connecting to a network to obtaining information from the Internet, allowing beginners in personal computers to easily access the Internet, thereby resolving the above described problems.

For that purpose, the Internet accessing apparatus of the present invention comprises a card interface portion, in which a first information storage card recording an Internet access point telephone number, an ID number of the card holder, and a password of the card holder, and a second information storage card recording a URL information designating the location where the desired homepages are stored, are installed in such a manner as to allow free insertion and removal, and which can read the information recorded on the first and second information storage cards. The Internet accessing apparatus further comprises a communication interface portion, which automatically originates a call to an Internet access point and connects to a WWW server, based on the information read from the first information storage card, an information processing portion, which by accessing a WWW server, retrieves and processes the WWW information, based on the information read from the second information storage card, a media interface portion, which presents the WWW information to the user, and an operation interface portion for receiving the user's operations with respect to the presented information. By providing the above, a user can connect to a WWW server which is the access point, based on the information recorded on the first information storage card, and can obtain WWW information, based on the information recorded on the second information storage card. This allows the series of processes from connecting to a network to retrieving information from the Internet (WWW information) to be executed automatically, thereby offering an environment which allows a user to easily access the Internet.

Additionally, the Internet accessing system of the present invention comprises an information processing apparatus, which employs a first information storage card recording an Internet access point telephone number, an ID number of the card holder, and a password of the card holder, and a second information storage card recording a URL information designating the location where the desired homepages are stored, and which detects the insertion of the first and second information storage cards and reads the information recorded on the first and second information storage cards, while activating the system. The Internet accessing system further comprises a communication processing apparatus, which automatically originates a call to an Internet access point and connects to a WWW server, based on the information read from the first information storage card, an information processing apparatus, which by accessing a WWW server, retrieves and processes the WWW information such as homepages, based on the information read from the second information storage card, a media interface apparatus, which presents the WWW information to the user, and an operation interface apparatus for receiving the user's operations. By providing the above, a user can connect to a WWW server which is the access point, based on the information recorded on the first information storage card, and can obtain WWW information, based on the information recorded on the second information storage card. This allows the series of processes from connecting to a network to retrieving information from the Internet (WWW information) to be executed automatically, thereby offering an environment which allows even a user, who does not have enough experience or knowledge about computers, to easily access the Internet.

Moreover, the Internet accessing method of the present invention which employs information storage cards, automatically originates a call to an Internet access point and connects to a WWW server, based on the information read from the first information storage card, which records an Internet access point telephone number, an ID number of the card holder, and a password of the card holder, retrieves WWW information, based on the information read from the second information storage card, which records a URL information designating the location where the desired homepages are stored, and presents the WWW information to the user. This allows the series of processes from connecting to a network to retrieving information from the Internet (WWW information) to be executed automatically by employing the two information storage cards, thereby allowing the user of the information storage cards to easily access the Internet.

DETAILED DESCRIPTION OF THE PREFERRED EMBODIMENTS OF THE INVENTION

Figure 1:
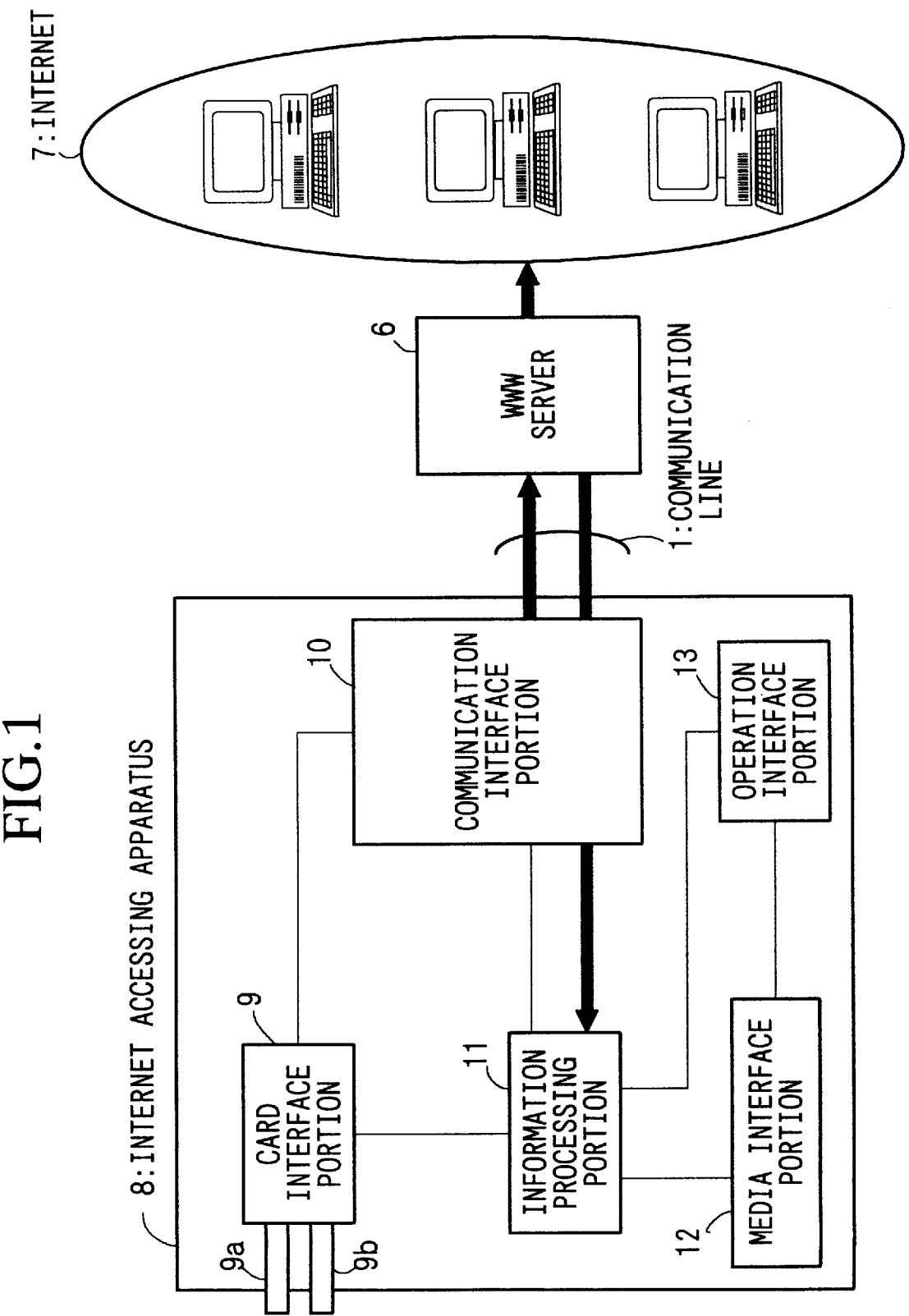
FIG. 1 is a structural diagram of an apparatus illustrating an embodiment of the Internet accessing apparatus described in the present invention.
Figure 12:
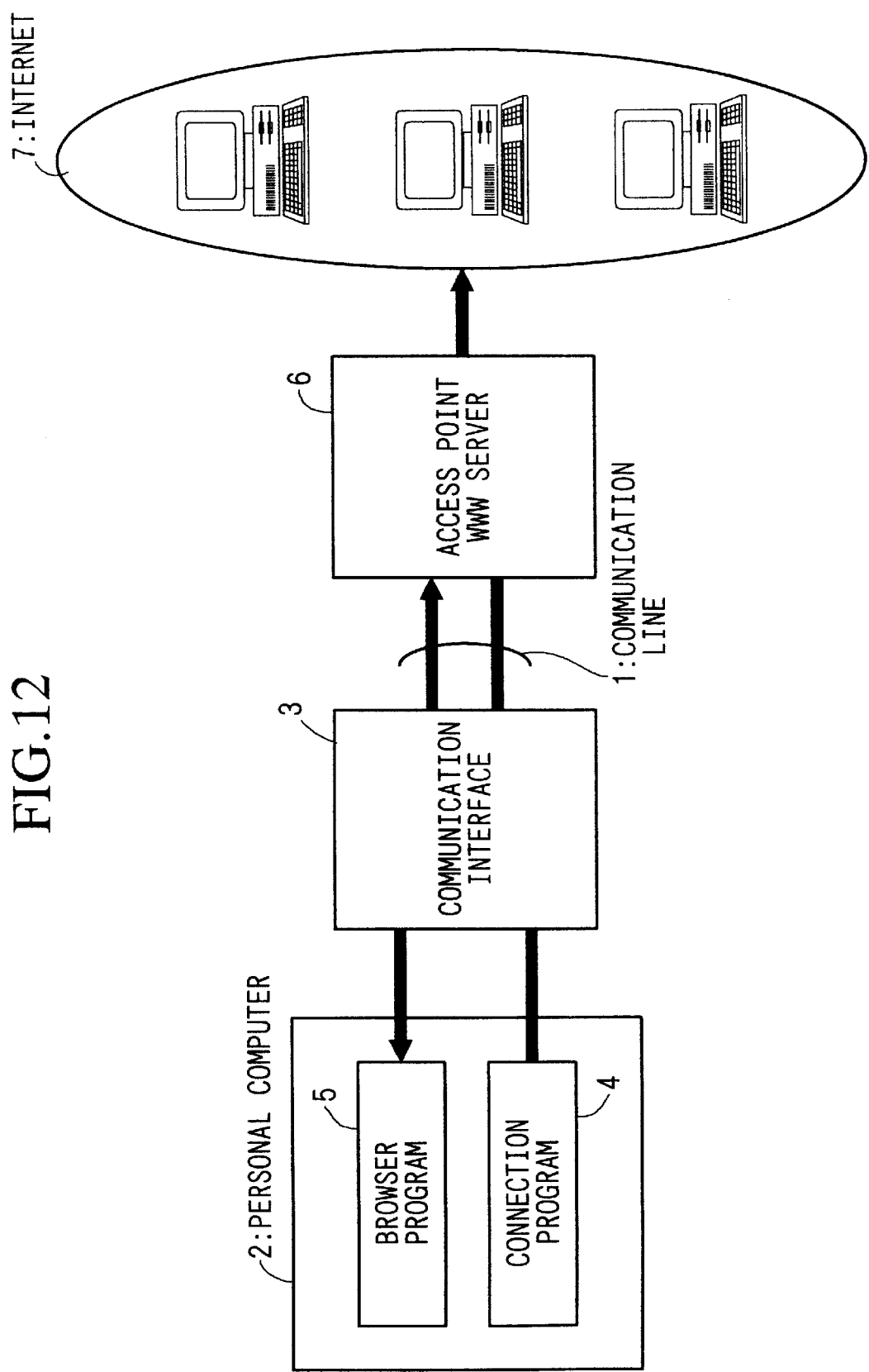
FIG. 12 is a structural diagram of a system illustrating an embodiment of a conventional system.

Next, the preferred embodiments of the present invention will be explained with reference to the drawings. Please note that identical reference numbers are used for identical structures throughout the drawings. FIG. 1 is a structural diagram of an apparatus illustrating an embodiment of the Internet accessing apparatus described in the present invention. The Internet accessing apparatus 8 is consisted of a card interface portion 9, a communication interface portion 10, an information processing portion 11, a media interface portion 12, and an operation interface portion 13. The Internet accessing apparatus 8 can be realized by adding a card interface portion 9 to a basic and essential structure for accessing the Internet consisting of a CPU (central processing unit), recording apparatus, modem, terminal adapters, and such found within the structures of the personal computer 2 and the communication interface 3 of FIG. 12, or to a structure which combines the personal computer 2 and the communication interface 3 as a single body.

The card interface portion 9 can install the two information storage cards 9a, 9b, which can have information recorded within the IC or the magnetic stripe beforehand, in such a manner as to allow free insertion and removal, read the information recorded on the information storage cards 9a, 9b, and write prescribed information onto the information storage cards 9a, 9b. The communication interface portion 10 offers to serve as an interface for the communication line 1 such as telephones and ISDN, and further offers, in the present invention, a function to automatically originate a call to an Internet access point and to connect to a WWW server which is the access point. Hereinafter, a server set to be the access point will be referred to as a "WWW server", and the homepage information and such obtained from this WWW server or from a server to which a connection is made via this WWW server over the Internet will be referred to as "WWW information" or "multimedia information".

The information processing portion 11, which by accessing information within a WWW server, retrieves and processes the WWW information such as homepages, based on the information read from the cards 9a, 9b. The media interface potion 12 has a function to present to the user the WWW information retrieved by the information processing portion 11 and the information within the Internet accessing apparatus 8, and functions as an interface to output signals with respect to displaying apparatuses consisting of a CRT and such and with respect to audio information outputting apparatuses consisting speakers and such. The operation interface portion 13 offers a function of an interface for the user to work with the information presented by the media interface portion 12, and is formed by an interface for operation units such as keyboards, mouses, joysticks, and remote control units.

Moreover, it is possible for the media interface portion 12, in substitute for the above, to present information directly to the user by providing a displaying portion or a audio information outputting portion within itself, and it is possible for the operation interface portion 13 to possess each operation unit within itself as well.

As for the two types of information storage cards 9a, 9b, which are to be installed into the card interface portion 9, one of the cards 9a, for example, may have recorded an Internet access point telephone number, a ID number of the card holder, and a password of the card holder, and may have inputted information for connecting to a WWW server using the recorded information, and the other card 9b, by having recorded the URL information designating the location where the homepages are stored, may have inputted information for accessing the WWW information. The card interface portion 9 detects the insertion of the card 9a, which is used for connecting to a WWW server, and reads the information recorded on the card 9a, while activating each portion of the apparatus 8. The card interface portion 9 also detects the removal of the card 9a, and ends the operation of each portion. In addition, the card interface portion 9 detects the insertion of the card 9b, which is used for accessing the WWW information, and while reading the information recorded on the card 9b, transfers the information recorded on the cards 9a, 9b to the communication interface portion 10, and then connects to a WWW server and accesses the WWW information. Additionally, the card interface portion 9 detects the removal of the card 9b, and executes the process to close the connection with the WWW server. Moreover, the card interface portion 9 detects the removal of the card 9b, and in addition to transmitting a request to the media interface portion 12 to present to the user, information to choose between continuation/closing of the connection with the WWW server, receives the user's selection via the operation interface portion 13 and based on that selection, proceeds with the continuation/closing process of the connection.

Furthermore, along with the URL information designating the location where the homepages are stored, the card 9b can record data to regulate the allowed connection time to the WWW information. In such a case, the card interface portion 9 of the Internet accessing apparatus 8 may have a function to read the remaining connection time data when the insertion of the card 9b is detected, to activate the connection if the remaining connection time is not zero, to decrease during connection the remaining connection time according to the amount of time connected, and while rewriting the remaining connection time information on the card 9b, if the remaining time is zero, to close the connection, and to transmit a request to the media interface portion 12 to present to the user the fact that the remaining connection time is zero, and thus connection is refused. The connection time information may be generated by the communication interface portion 9, or by the WWW server at the connection site, whereby the relevant information is periodically transferred to the communication interface portion 9.

In this Internet accessing apparatus 8 as illustrated in FIG. 1, the information read by the card interface portion 9 is transferred to the communication interface portion 10 and the information processing portion 11, and is used to connect from the communication interface portion 10 to a WWW server established as an access point 6, via the communication line 1. The information processing portion 11 accesses the Internet 7 via the communication interface portion 10 and retrieves multimedia information, transfers it to the media interface portion 12, and presents it to the user. The user then works with the multimedia information via the operation interface portion 13.

Figure 2:
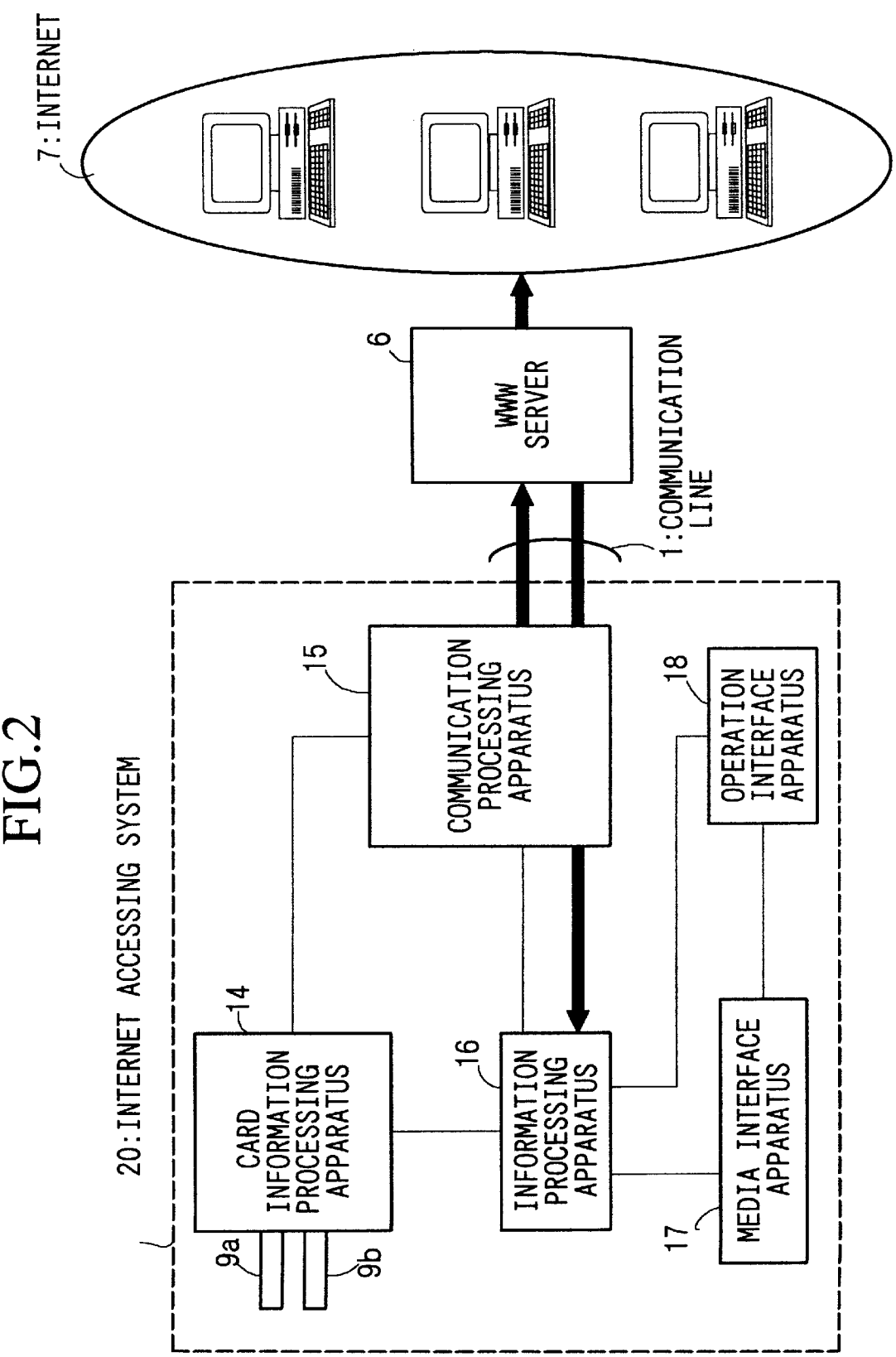
FIG. 2 is a structural diagram of a system illustrating an embodiment of the Internet accessing system described in the present invention.

FIG. 2 is a structural diagram of a system illustrating an embodiment of the Internet accessing system according to the present invention. The Internet accessing system 20 illustrated in FIG. 2 is formed by having each of the portions within the Internet accessing apparatus explained with reference to FIG. 1 be an independently operating apparatus (for example, personal computers or workstations and apparatuses combining the input output peripheral devices thereof, or apparatuses intended for realizing each function), and comprises a card information processing apparatus 14, a communication processing apparatus 15, an information processing apparatus 16, a media interface apparatus 17, and an operation interface apparatus 18. The card information processing apparatus 14, the communication processing apparatus 15, the information processing apparatus 16, the media interface apparatus 17, and the operation interface apparatus 18 illustrated in FIG. 2 all offer the identical functions as the card interface portion 9, the communication interface portion 10, the information processing portion 11, the media interface portion 12, and the operation interface portion 13 illustrated in FIG. 1.

Due to the above structure, the information obtained by the card information processing apparatus 14 is transferred to the information processing apparatus 15. First, the information processing apparatus 16 connects from the communication processing apparatus 15 to a WWW server established as the access point 6 via the telephone or ISDN communication line 1. Then, the information processing apparatus 16 accesses the Internet 7 via the communication processing apparatus 16, retrieves the multimedia information. This multimedia information is transferred to the media interface apparatus 17 and is presented to the user. The user works with the multimedia information via the operation interface apparatus 18.

The card information processing apparatus 14 employs the two types of information storage cards 9a, 9b, and utilizes the first card 9a only for connecting to the WWW server by using the internet access point telephone number, the ID number of the card holder, and the password of the card holder recorded on that card, and utilizes the second card 9b only for accessing the WWW information by using the URL information designating the location where the homepages are stored, recorded on that card.

In addition, the card information processing apparatus 14 can detect the removal of the card 9a which is for connecting to the WWW server, and can perform the process of closing the connection with the WWW server. Moreover, the card information processing apparatus 14 can detect the removal of the card 9b which is for accessing the WWW information, and in addition to transmitting a request to the communication processing apparatus 15 to present to the user via the media interface apparatus 17, information to choose between continuation/closing of the connection with the WWW server, receives the user's selection via the operation interface apparatus 18 and based on that selection, proceeds with the continuation/closing process of the connection.

Further, the card information processing apparatus 14 may have a function to read the remaining connection time data when the insertion of the card 9b is detected, to activate the connection if the remaining connection time is not zero, to decrease during connection the remaining connection time according to the amount of time connected, and while rewriting the remaining connection time information on the card 9b, if the remaining time is zero, to close the connection, and to transmit a request to the media interface apparatus 17 to present to the user the fact that the remaining connection time is zero, and thus connection is refused.

Furthermore, the connection time information may be generated by the communication processing apparatus 15 or the information processing apparatus 16, or by the WWW server at the connection site, whereby the relevant information is periodically transferred to the information processing apparatus 16.

Figure 3:
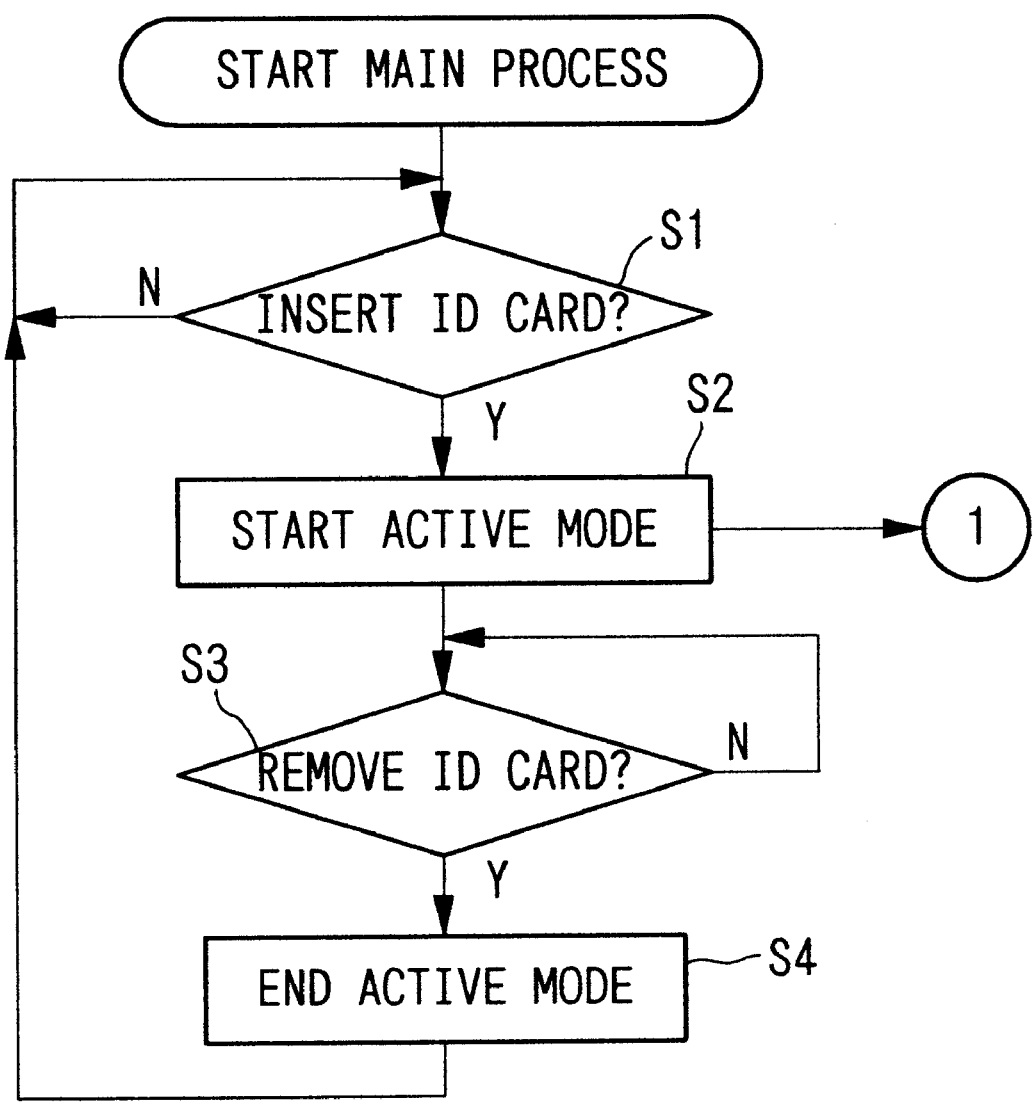
FIG. 3 is a flowchart illustrating an example of the flow of the main processes according to the present invention.

FIG. 3, FIG. 4, FIG. 5, FIG. 6, FIG. 7, FIG. 8, FIG. 9, FIG. 10, FIG. 11 are flowcharts illustrating examples of the flow of processes of the Internet accessing apparatus and the system thereof according to the present invention. The links used within the flowcharts illustrated in each drawing uses common reference numbers with respect to each of the drawings. Accordingly, the links having identical reference numbers illustrated within identical drawings or different drawings are linked together. FIG. 3 illustrates the flow of the main processes. The main processes start with the insertion of the card 9a (hereinafter, referred to as ID card) into the card interface portion 9 or the card information processing apparatus 14, and end with the removal of the ID card. When the ID card insertion check routine SI recognizes the insertion of the ID card, the active mode is started (S2), in addition to starting the ID card removal check routine S3. When the removal of the ID card is recognized, the active mode is forcibly ended (S4) even if the active mode is in the middle of executing its processes, and the process returns to the ID card insertion check routine.

Figure 4:
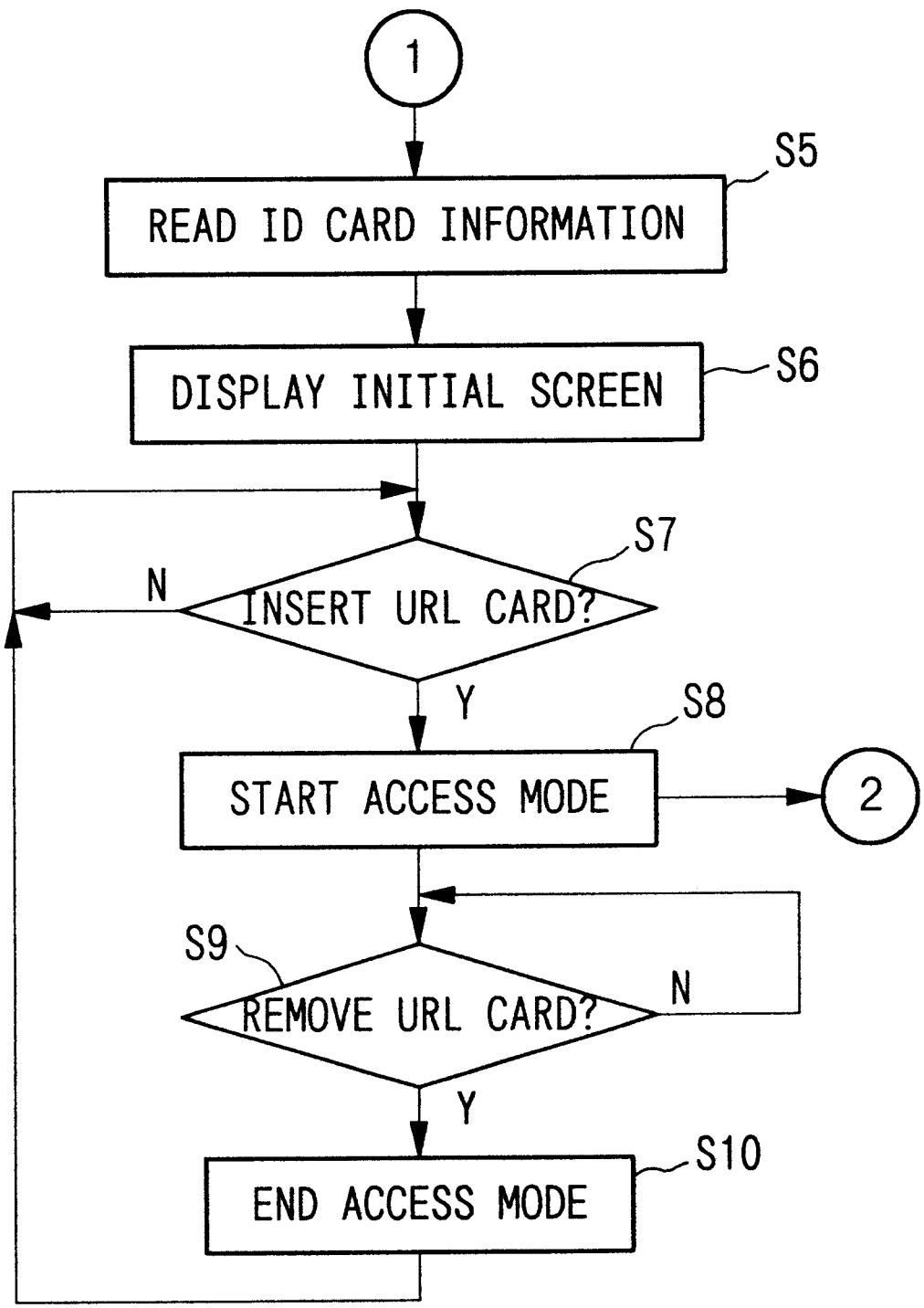
FIG. 4 is a flowchart illustrating an example of the processes of the active mode according to the present invention.

FIG. 4 is a flowchart illustrating an example of the processes of the active mode started at step S2 in FIG. 3. In the active mode, the process of this mode first reads the information recorded on the ID card via the card interface portion 9 or the card information processing apparatus 14 (S5), then displays an initial screen (S6) to inform the user that the active mode has started, through the media interface portion 12 or the media interface apparatus 17, and proceeds to the card 9b (hereinafter, referred to as URL card) insertion check routine S7 of the card interface portion 9 or the card information processing apparatus 14. When the insertion of the URL card is recognized, the processes of the access mode is started (S8), and the process proceeds to the URL card removal check routine S9. When the removal of the URL card is recognized, the communication line is forcibly cut and the process is ended (SIO) even if the access mode is in the middle of executing its processes, and the process returns to the URL card insertion check routine S7.

Figure 5:
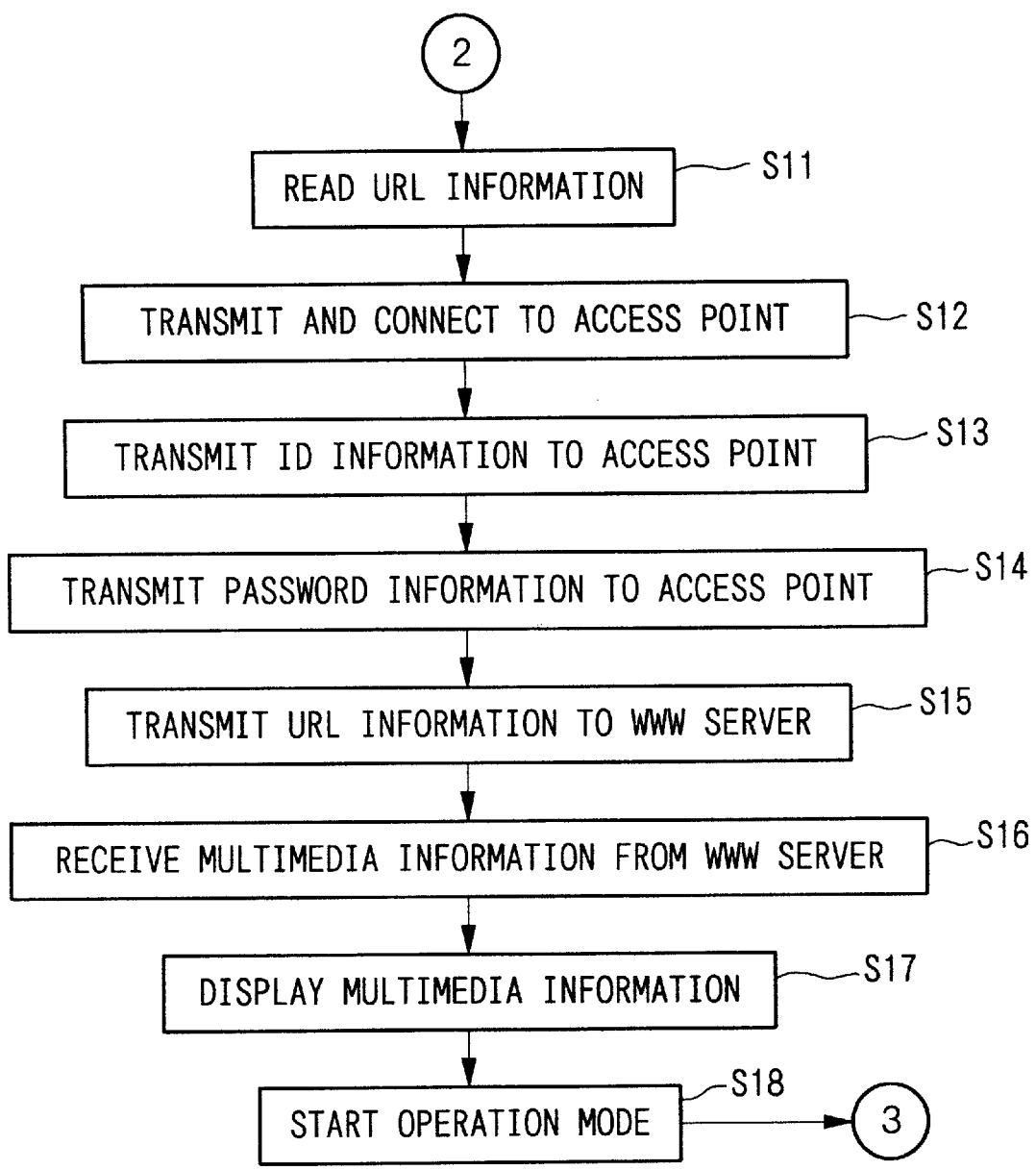
FIG. 5 is a flowchart illustrating an example of the processes of the access mode according to the present invention.

FIG. 5 is a flowchart illustrating an example of the processes of the access mode started at step S8 in FIG. 4. In the access mode, the process of this mode first reads the information recorded on the URL card via the card interface portion 9 or the card information processing apparatus 14 (S11). Next, a call to the access point is originated by using the access point telephone number recorded on the ID card, and performs the dialup connection (S12). Then, in order to connect with the WWW server, the user's ID information read from the ID card is transmitted to the access point (S13), and in order to verify the user, the password information is transmitted (S14), and this completes the connection to the WWW server. Also, the URL information obtained from the URL card is transmitted to the Internet via the WWW server (S15), and the multimedia information received (S16) via the WWW server is displayed (S17). And after the processes of the operation mode is started (S18), the processes of the access mode ends.

Figure 6:
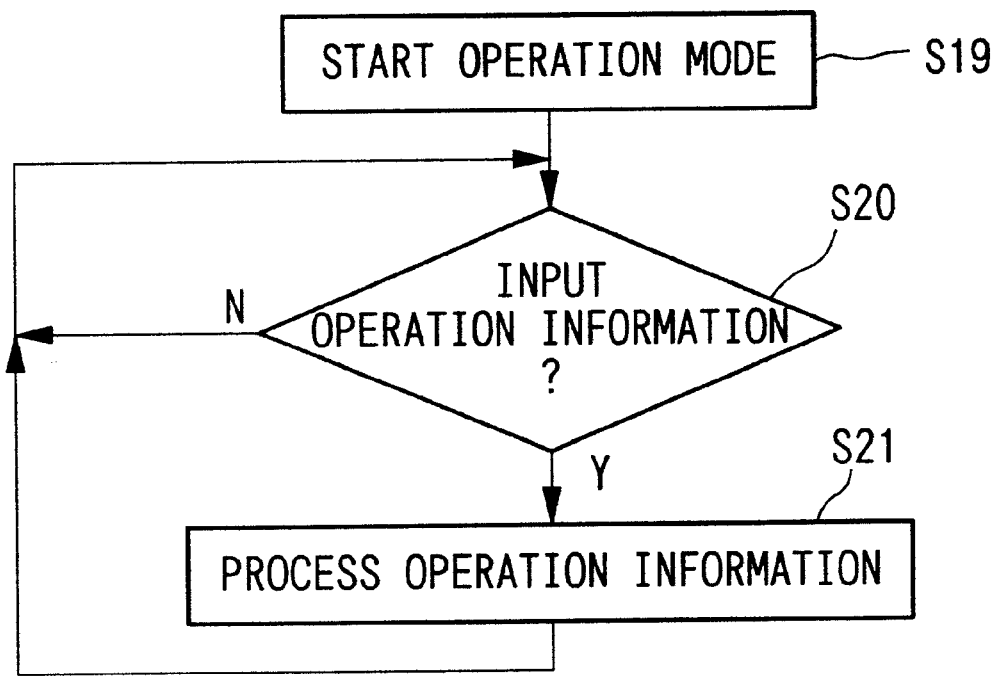
FIG. 6 is a flowchart illustrating an example of the processes of the operation mode according to the present invention.

FIG. 6 illustrates an example of the processes of the operation mode started at step S18 in FIG. 5. The operation mode is started (S19) simultaneously with the activating of the operation information input check routine S20. When the operation information input is detected by the operation interface portion 13 or the operation interface apparatus 18, the operation information processes are executed (S21), and after it ends, the process then returns to the operation information input check routine S20.

Figure 7:
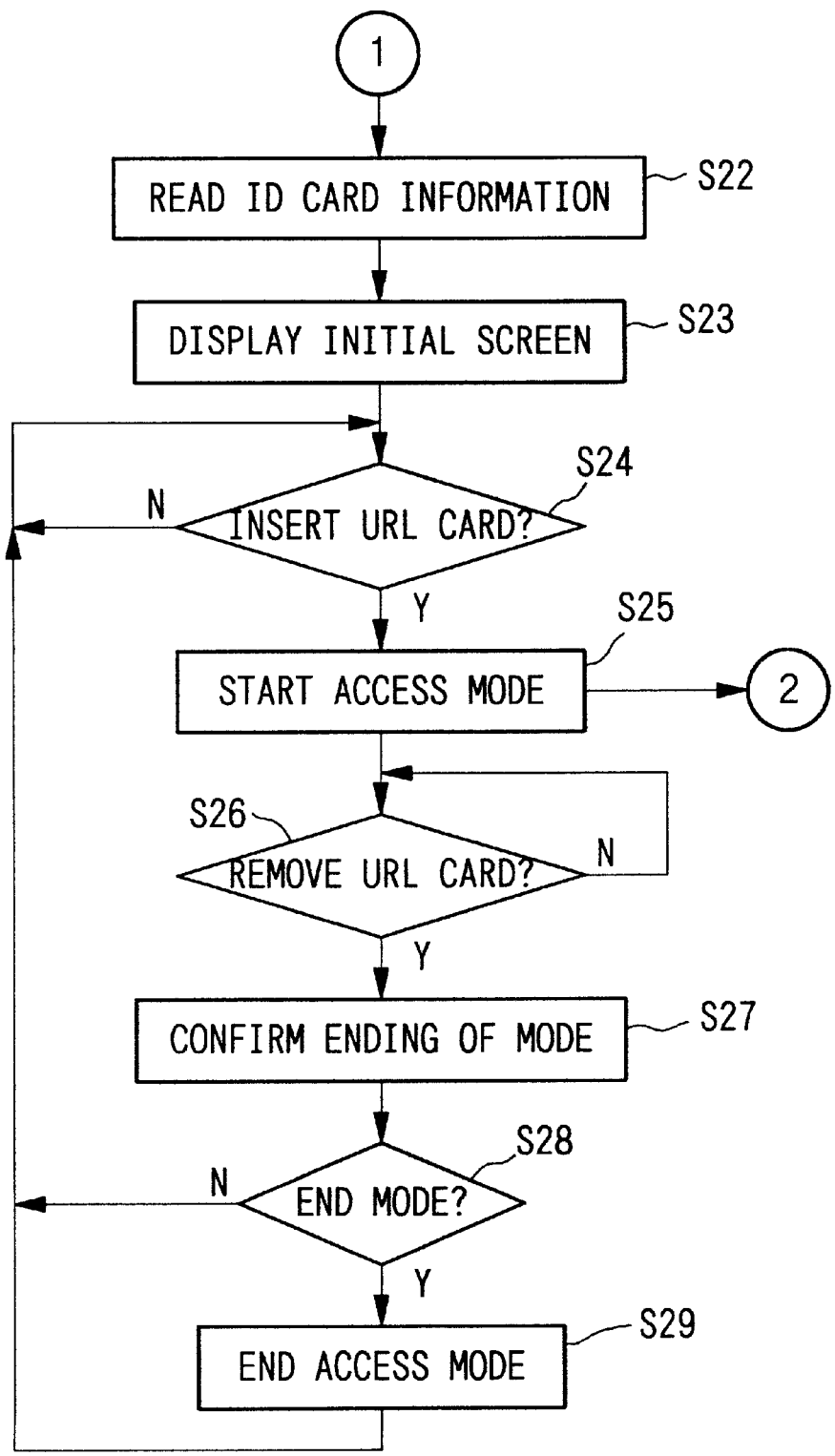
FIG. 7 is a flowchart illustrating an example of different processes relating to the active mode of the present invention.

FIG. 7 illustrates an example of different processes relating to the active mode started at step S2 in FIG. 3, and has in addition to the processes of the active mode of FIG. 4, processes to further confirm the ending of the access mode to the user.

First, the information recorded on the ID card is read (S22), the initial screen to inform the user that the active mode has started is displayed (S23), and the URL card insertion check routine S24 is executed. When the insertion of the URL card is recognized, the processes of the access mode is started (S25), and the process proceeds to the URL card removal check routine S26. When the removal of the URL card is recognized, even if the access mode is in the middle of executing its processes, it is forcibly aborted and a screen to confirm the ending of the active mode is displayed (S27), and checks the input from the user (S28). In the case the user chooses to end, after the communication line is cut and the access mode has ended, the process returns to the URL card insertion check routine S24. Moreover, in the case the user chooses to continue, the process returns to the URL card insertion check routine S24 while having the communication line connected.

Figure 8:
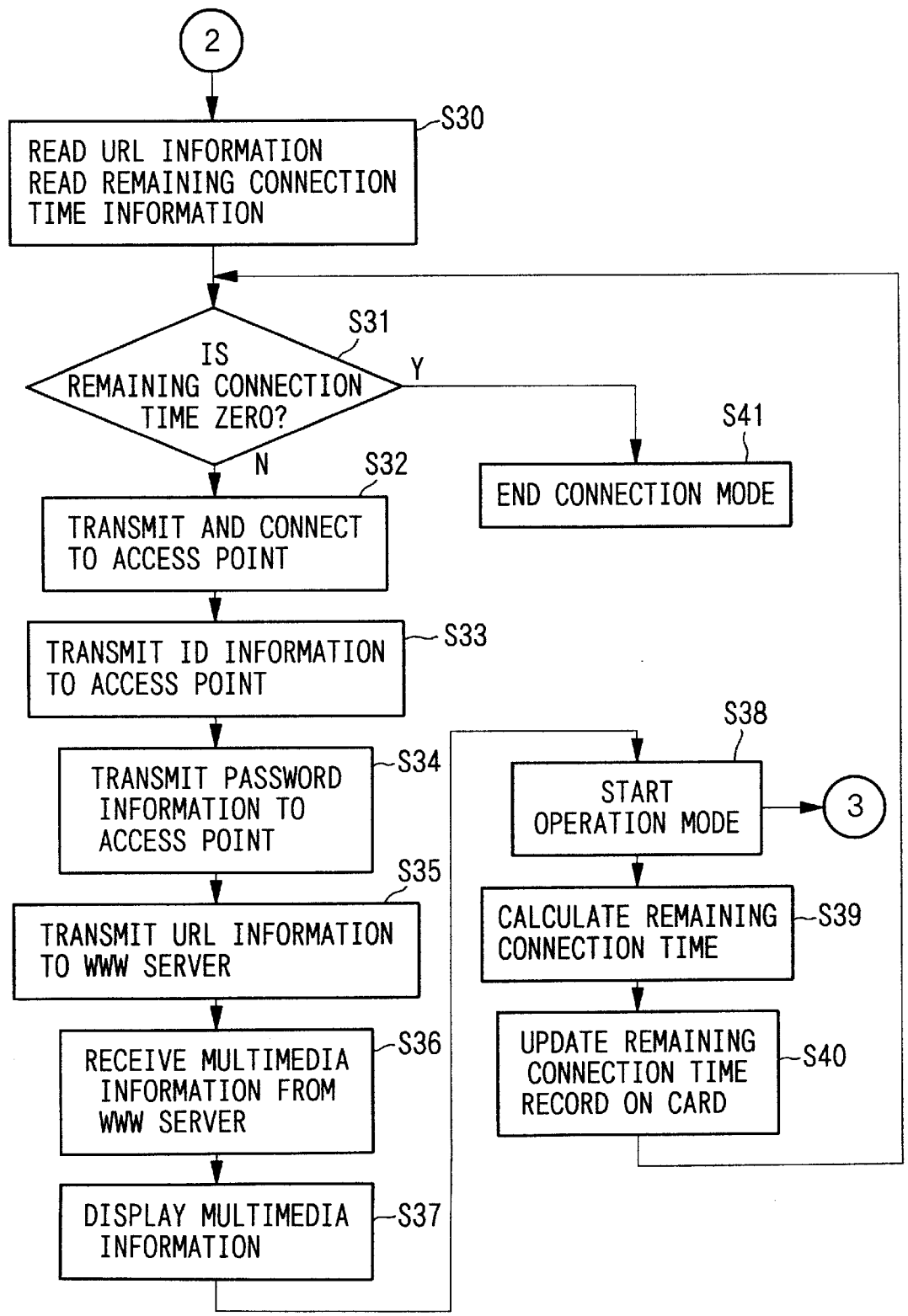
FIG. 8 is a flowchart illustrating an example of the processes relating to the access mode of the present invention for the case where the remaining connection time is recorded on the URL card.

FIG. 8 illustrates an example of different processes of the access mode started at step S8 in FIG. 4. This is a flowchart of the case where the remaining connection time is recorded on the URL card, and the calculation of this remaining connection time is performed by the Internet accessing apparatus or the Internet accessing system, and the remaining connection time on the URL card is updated.

In the access mode, the process of this mode first reads the URL information and the remaining connection time information recorded on the URL card via the card interface portion 9 or the card information processing apparatus 14 (S30). Then, it examines whether the remaining connection time has already expired (S31), and if the remaining connection time has reached zero, then the processes identical to those when the URL card is removed is executed and the connection mode is ended (S41). In the case where the remaining connection time is not zero, communication interface portion 10 or communication processing apparatus 15 originates a call to the access point using the access point telephone number recorded on the ID card, and performs the dialup connection (S32). Next, in order to connect with the WWW server, the user's ID information read from the ID card is transmitted to the access point (S33), and in order to verify the user, the password information is transmitted (S34), and this completes the connection to the WWW server. Also, the URL information obtained from the URL card is transmitted to the Internet (S35), and the multimedia information received (S36) via the WWW server is displayed (S37). The process activates the process of operation mode (S38), and then calculates the remaining connection time (S39) and updates the remaining connection time every fixed interval of time and records that on the URL card (S40). And then the process is returned to the routine which examines whether the remaining connection time is zero S31.

Figure 9:
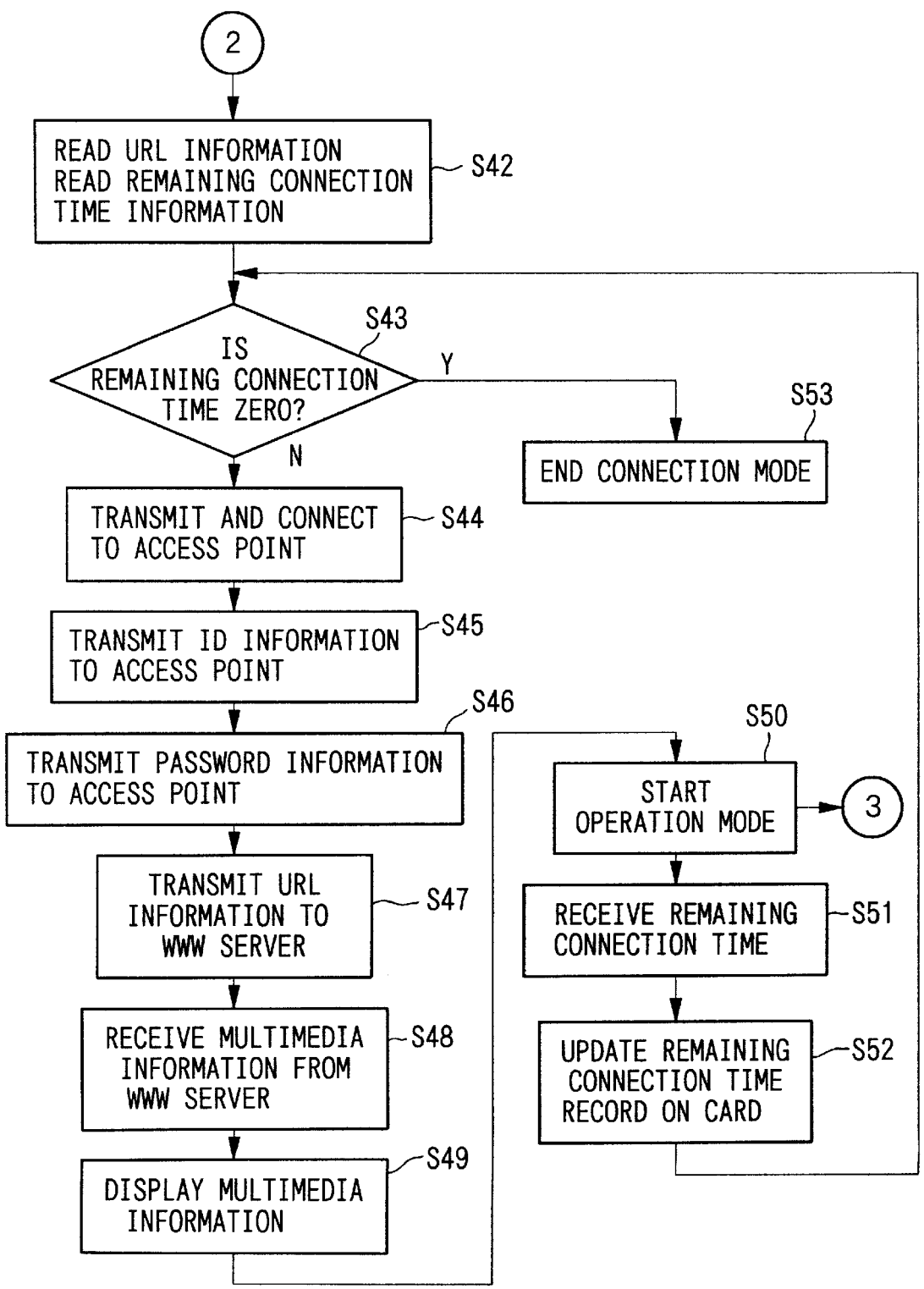
FIG. 9 is a flowchart illustrating an example of different processes relating to the access mode of the present invention for the case where the remaining connection time is recorded on the URL card.

FIG. 9 illustrates an example of different processes of the access mode started at step S8 in FIG. 4. This is a flowchart of the case where the remaining connection time is recorded on the URL card, and this remaining connection time is obtained from the WWW server, and the remaining connection time on the URL card is updated.

In the access mode, the process of this mode first reads the URL information and the remaining connection time information recorded on the URL card (S42). Then, it examines whether the remaining connection time has already expired (S43), and if the remaining connection time has reached zero, then the processes identical to those when the URL card is removed is executed and the connection mode is ended (S53). In the case where the remaining connection time is not zero, the access mode originates a call to the access point using the access point telephone number recorded on the ID card, and performs the dialup connection (S44). Next, in order to connect with the WWW server, the user's ID information read from the ID card is transmitted to the access point (S45), and in order to verify the user, the password information is transmitted (S46), and this completes the connection to the WWW server. Also, the URL information obtained from the URL card is transmitted to the Internet via the WWW server (S47), and the multimedia information received (S48) via the WWW server is displayed (S49), and the processes of the operation mode is started (S50). At the same time, the remaining connection time is periodically received from the WWW server (S51), and in addition to updating the remaining connection time every fixed interval of time and recording that on the URL card (S52), the process is returned to the routine which examines whether the remaining connection time is zero S43.

By this means, in the case where the remaining connection time is recorded on the URL card, URL cards may be sold for prices corresponding to the recorded remaining connection time. Possessing the function with respect to the access mode of the Internet accessing apparatus or the system thereof as explained using FIG. 8 and FIG. 9, the URL cards may thus have applied the characteristics of a pre-paid card.

Figure 10:
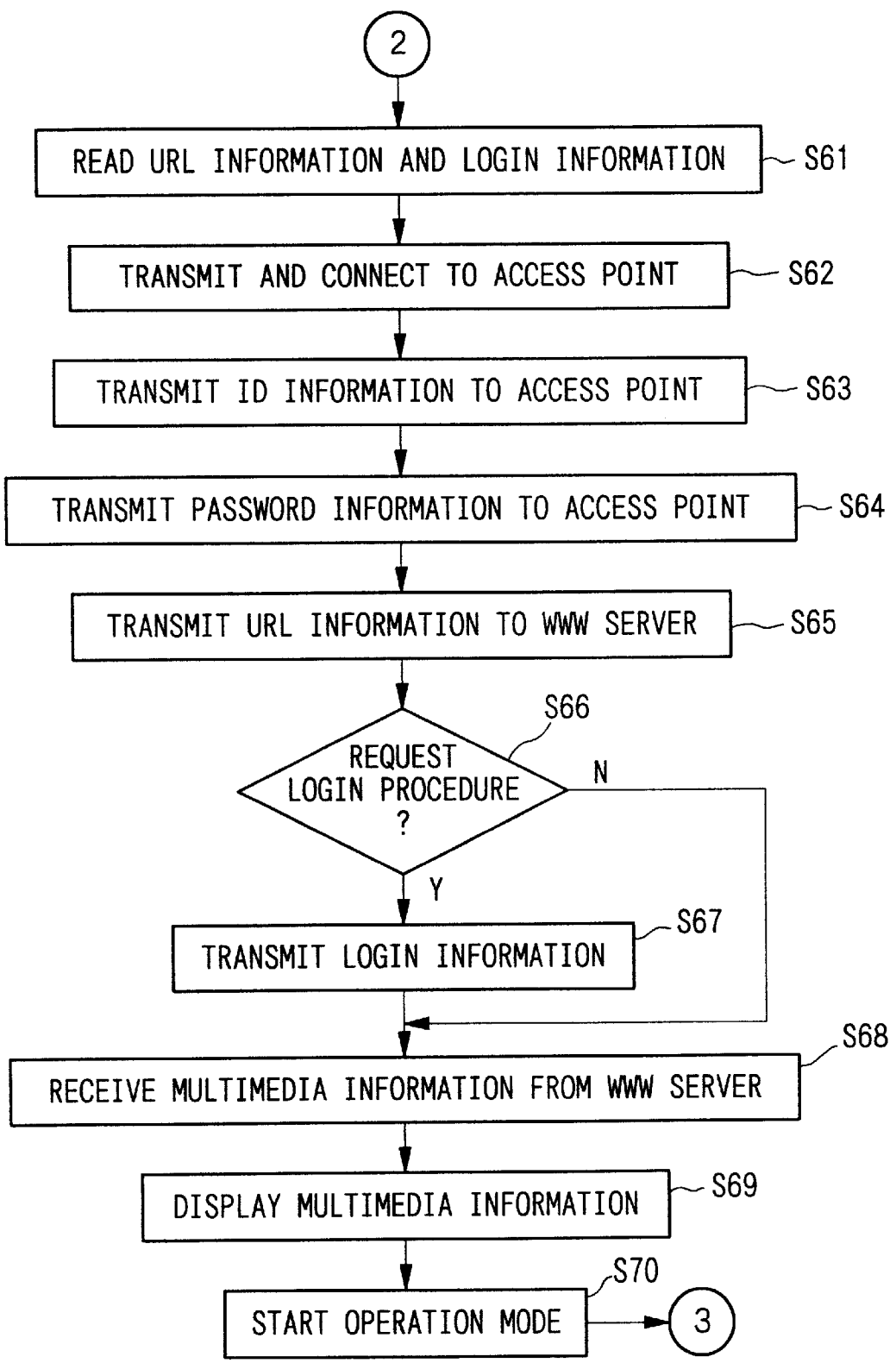
FIG. 10 is a flowchart illustrating an example of the processes relating to the access mode of the present invention for the case where the login information for displaying the multimedia information is recorded on the ID card.

FIG. 10 is a flowchart illustrating an example of different processes of the access mode started at step S8 in FIG. 4. This is a flowchart of the case where necessary login information for displaying the WWW information is further recorded on the ID card, and if it receives a request for login procedure in order to display the WWW information, it transmits the login information recorded on the ID card.

In the access mode, the process of this mode first reads the information recorded on the URL card and login information for accessing the homepage indicated by this URL information from the ID card (S61). Next, it originates a call to the access point using the access point telephone number recorded on the ID card, and performs the dialup connection (S62). Then, in order to connect with the WWW server, the user's ID information read from the ID card is transmitted to the access point (S63), and further, in order to verify the user, the password information is transmitted (S64), and this completes the connection to the WWW server. Also, the URL information obtained from the URL card. is transmitted to the Internet (S65).

And in the case where a login procedure request for displaying the multimedia information is sent from the server on the Internet storing the homepage information designated by the URL information via the WWW server (S66), the login information for displaying the multimedia information obtained from the ID card is transmitted (S67), thus completing the login procedure.

Then, the multimedia information received (S68) via the WWW server is displayed (S69), and the processes of the operation mode is started (S70).

Furthermore, as for the above operation, although the login information for accessing the homepage designated by the URL information is read from the ID card, when there is a request for the login procedure (S66), the login information for accessing the homepage designated by the URL information is read from the ID card, and this login information may be transmitted to the Internet (S67), thus completing the login procedure.

By this means, the login information of the homepage designated by the URL information recorded on the URL card is recorded on the ID card and is distributed to the user. Possessing the function with respect to the access mode of the Internet accessing apparatus or the system thereof as explained using FIG. 10, the ID cards may thus have applied the characteristics of a key to view the homepages requiring membership. In addition, by having the user strictly protect the ID card recording person information, it would be possible to sufficiently protect access by non-members.

Furthermore, it is possible to record, in URL information based categorizes, a plurality of login information of the homepage designated by the URL information recorded on each URL card.

Figure 11:
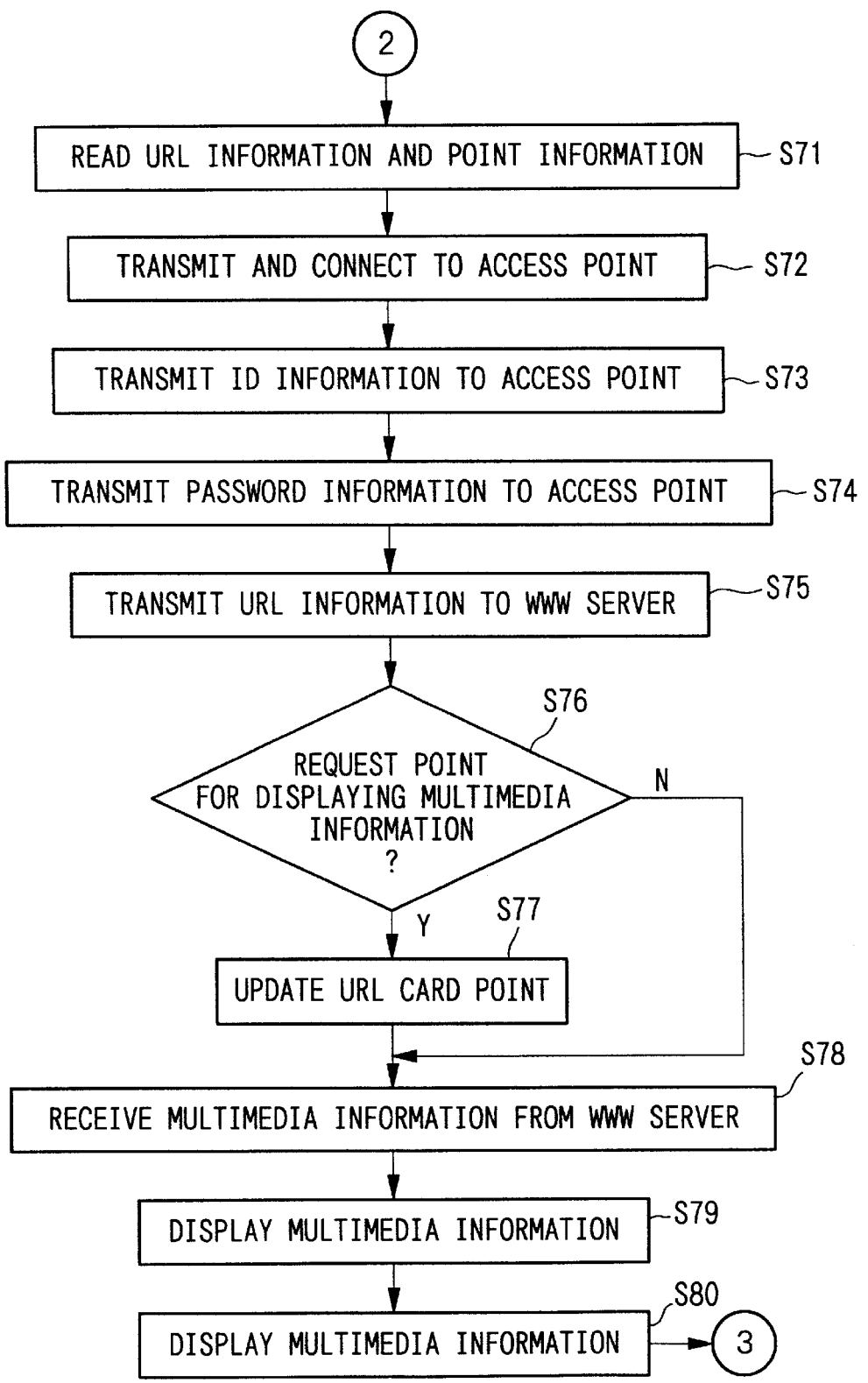
FIG. 11 is a flowchart illustrating an example of different processes relating to the access mode of the present invention for the case where the point information for displaying the multimedia information is recorded on the URL card.

FIG. 11 is a flowchart illustrating an example of different processes of the access mode started at step S8 in FIG. 4. This is a flowchart of the case where necessary point information for displaying the WWW information is further recorded on the URL card, and if it receives a request concerning the points for displaying the WWW information, it is recorded on this URL card and the point information is updated.

In the access mode, the process of this mode first reads the information recorded on the URL card and point information for displaying the multimedia information necessary for viewing the homepage indicated by this URL information from the URL card (S71). Next, the access mode originates a call to the access point using the access point telephone number recorded on the ID card, and performs the dialup connection (S72). Then, in order to connect with the WWW server, the user's ID information read from the ID card is transmitted to the access point (S73), and further, in order to verify the user, the password information is transmitted (S74), and this completes the connection to the WWW server. Also, the URL information obtained from the URL card is transmitted to the Internet (S75).

And in the case where a request concerning the points for displaying the multimedia information is sent from the server on the Internet storing the homepage information designated by the URL information via the WWW server (S76), the point processes corresponding to the content of the request that was sent are performed, and the updating processes of the point information of the URL card are performed (S77). For example, if the content of the request instructed to subtract the requested number of points, then at step S71, the number of points in the request is subtracted from the point information on the URL card, the updating of the point information of the URL card is performed by rewriting the point information on the URL card with the calculated result. Moreover, at this step S77, if the result after subtracting the requested number of points is a negative value, or if the point is already at zero, then the user is notified of that information and the access mode ends. Additionally, if the content of the request instructed to add the requested number of points, then at step S71, the number of points in the request is added to the point information on the URL card, the updating of the point information of the URL card is performed by rewriting the point information on the URL card with the calculated result.

Then, the multimedia information received (S78) via the WWW server is displayed (S79), and the processes of the operation mode is started (S80).

Furthermore, as for the above operation, although the point information is read from the URL card, when there is a point request (S76), the point information is read from the URL card, and the requested number of points may be processed, and the point information of the URL card may be updated using the calculated result (S77).

Moreover, the point request is not transacted only once when a homepage is accessed, but is continually requested based on the contents of the multimedia information operated and displayed by the operation mode or based on the display time. And the Internet accessing apparatus or the system thereof may update the point information on the URL card at each request.

By this means, the URL information along with the point information is recorded on the URL card, and URL cards may be sold for prices corresponding to the recorded remaining connection time. Possessing the function with respect to the access mode of the Internet accessing apparatus or the system thereof as explained using FIG. 11, the URL cards may thus have applied the characteristics of a pre-paid card for viewing homepages designated by the URL information. Additionally, in the case where this URL card is distributed for free, it is possible for the URL cards to have applied the characteristics of a sample card for verifying the contents of the homepages for viewing for only the number points recorded the homepages designated by the URL information.

Furthermore, it may be possible to require a membership beforehand in order to view a homepage designated by the URL information recorded on the URL card, and to also require points for viewing that homepage. In such a case, if the login information for viewing a homepage is recorded on the ID card, and the point information is recorded on the URL card, then the processes of the access mode will be one that combines both processes of FIG. 10 and FIG. 11.

It should be noted that for the ID card and the URL card, which are information storage cards, it would be desirable to take into consideration price, portability, and function before selecting a contacting or non-contacting IC card.

In addition, the ID card, as described above, primarily records personal information such as an Internet access point telephone number, an ID number of the card holder, and a password of the card holder, in order to connect to a WWW server which is the access point. Accordingly, because high security is demanded to protect such personal information, it may be desirable to use an IC card which internalizes a processor that can perform encryption, such an IC card based on the ISO7816.

On the other hand, after connection is established with the WWW server which is the access point by the ID card, the URL card records information relating to the type of service/ information used over the Internet. Concretely speaking, although the URL information designating the location where the homepage is stored, is recorded, as described above, this information does not require high security. In addition, since this information has the characteristic of allowing the combination with any ID card, it is desirable to take into consideration prospects of wide circulation, and choosing a low cost serial memory card.

By this means, by having these two types of separate cards, the ID card can be issued to a user via a distribution route maintaining security with one card per person, while the URL card may be made available through direct mail or by being attached to magazines by those who wish to widely advertise homepage address information, and thus can be easily distributed through routes which does not require as much security as those of the ID card.

In addition, the ID card can be applied the characteristic of a key for connecting to a WWW server which is the access point, while the URL card can be applied the characteristic of a key for connecting to a homepage designated by the recorded URL information. Accordingly, by possessing one ID card and a plurality of URL cards recording URL information of homepages of which a user desires services/ information, a user can easily access each homepage of which the user desires services/information by simply switching URL cards.

According to the preferred embodiments of the present invention as described above, the series of operations from connecting to the WWW server, to accessing the WWW information, to retrieving data is made simple, and an environment for a user to easily access the Internet is realized.

Although the embodiments were described above with the Internet, being the representing computer communication network, used as an example, the present invention is not restricted to that and is just as well appropriate to other computer communication networks.

Although the preferred embodiments were described above with information storage cards (IC cards) for ID cards and URL cards, used as an example, the present invention is not restricted to that and is just as well appropriate to other recording media.

Furthermore, a program which controls each portion, each apparatus of the Internet accessing apparatus in FIG. 1 and the Internet accessing system in FIG. 2, and which realizes the processes described above, may be recorded on a computer readable recording medium. The program recorded on this recording medium may then be read by a computer, and by executing this program, may realize the processes described above.

What is claimed is:

1. An Internet accessing apparatus comprising:

a card interface portion, in which a first information storage card recording an Internet access point telephone number, an ID number of the card holder, and a password of the card holder, and a second information storage card recording a URL information designating the location where the desired homepages are stored, are installed in such a manner as to allow free insertion and removal, and which can read the information recorded on said first and second information storage cards;

a communication interface portion, which automatically originates a call to an Internet access point and connects to a WWW server, based on the information read from said first information storage card;

an information processing portion, which by accessing a WWW server, retrieves and processes the WWW information, based on the information read from said second information storage card;

a media interface portion, which presents said WWW information to the user; and an operation interface portion for receiving the user's operations with respect to said presented information.

2. An Internet accessing apparatus in accordance with claim 1, in which said card interface portion detects the insertion of said first information storage card, activates the other portions, while reading the information recorded on said first information storage card, and ends the operation of the other portions when the removal of said first information storage card is detected.

3. An Internet accessing apparatus in accordance with claim 1, in which said card interface portion closes the connection with said WWW server when the removal of said second information storage card is detected.

4. An Internet accessing, apparatus in accordance with claim 1, in which said information processing portion, in the case where data regulating a remaining connection time with said WWW information is recorded on said second information storage card in addition to said URL information designating the location where the homepages are stored, reads said remaining connection time recorded on said second information storage card via said card interface portion, decreases said remaining connection time by an amount corresponding to the amount of time connected to said WWW server, and updates said remaining connection time recorded on said second information storage card with the subtracted result via said card interface portion.

5. An Internet accessing apparatus in accordance with claim 2, in which said information processing portion, in the case where data regulating a remaining connection time with said WWW information is recorded on said second information storage card in addition to said URL information designating the location where the homepages are stored, reads said remaining connection time recorded on said second information storage card via said card interface portion, decreases said remaining connection time by an amount corresponding to the amount of time connected to said WWW server, and updates said remaining connection time recorded on said second information storage card with the subtracted result via said card interface portion.

6. An Internet accessing apparatus in accordance with claim 3, in which said information processing portion, in the case where data regulating a remaining connection time with said WWW information is recorded on said second information storage card in addition to said URL information designating the location where the homepages are stored, reads said remaining connection time recorded on said second information storage card via said card interface portion, decreases said remaining connection time by an amount corresponding to the amount of time connected to said WWW server, and updates said remaining connection time recorded on said second information storage card with the subtracted result via said card interface portion.

7. An Internet accessing apparatus in accordance with claim 1, in which said information processing portion, in the case where a login information necessary for displaying said WWW information is further recorded on said first information storage card, reads said login information recorded on said first information storage card via said card interface portion, and transmits said login information, when said information processing portion receives a request for said login information for displaying said WWW information.

8. An Internet accessing apparatus in accordance with claim 2, in which said information processing portion, in the case where a login information necessary for displaying said WWW information is further recorded on said first information storage card, reads said login information recorded on said first information storage card via said card interface portion, and transmits said login information, when said information processing portion receives a request for said login information for displaying said WWW information.

9. An Internet accessing apparatus in accordance with claim 3, in which said information processing portion, in the case where a login information necessary for displaying said WWW information is further recorded on said first information storage card, reads said login information recorded on said first information storage card via said card interface portion, and transmits said login information, when said information processing portion receives a request for said login information for displaying said WWW information.

10. An Internet accessing apparatus in accordance with claim 1, in which said information processing portion, in the case where a point information necessary for displaying said WWW information is further recorded on said second information storage card, reads said point information recorded on said second information storage card via said card interface portion, processes said point information in compliance with a point request, and updates said point information recorded on said second information storage card with the processed result via said card interface portion, when said information processing portion receives said point request for displaying said WWW information.

11. An Internet accessing apparatus in accordance with claim 2, in which said information processing portion, in the case where a point information necessary for displaying said WWW information is further recorded on said second information storage card, reads said point information recorded on said second information storage card via said card interface portion, processes said point information in compliance with a point request, and updates said point information recorded on said second information storage card with the processed result via said card interface portion, when said information processing portion receives said point request for displaying said WWW information.

12. An Internet accessing apparatus in accordance with claim 3, in which said information processing portion, in the case where a point information necessary for displaying said WWW information is further recorded on said second information storage card, reads said point information recorded on said second information storage card via said card interface portion, processes said point information in compliance with a point request, and updates said point information recorded on said second information storage card with the processed result via said card interface portion, when said information processing portion receives said point request for displaying said WWW information.

13. An Internet accessing system comprising:
 a card information processing apparatus, in which a first information storage card recording an Internet access point telephone number, an ID number of the card holder, and a password of the card holder, and a second information storage card recording a URL information designating the location where the desired homepages are stored, are employed, and which detects the insertion of said first and second information storage cards, and which activates the system, while reading the information recorded on said first and second information storage cards;
 a communication processing apparatus, which automatically originates a call to an Internet access point and connects to a WWW server, based on the information read from said first information storage card;
 an information processing apparatus, which by accessing a WWW server, retrieves and processes the WWW information such as homepages, based on the information read from said second information storage card;
 a media interface apparatus, which presents said WWW information to the user; and
 an operation interface apparatus for operating on said presented information.

14. An Internet accessing system in accordance with claim 13, in which said card information processing apparatus detects the insertion of said first information storage card, activates the system, while reading the information recorded on said first information storage card, and ends the system when the removal of said first information storage card is detected.

15. An Internet accessing system in accordance with claim 13, in which said card information processing apparatus detects the insertion of said second information storage card, reads the information recorded on said second information storage card, while transmitting to said communication processing apparatus the information recorded on said first and second information storage cards, and connects to said WWW server and accesses said WWW information.

16. An Internet accessing system in accordance with claim 13, in which said information processing apparatus, in the case where data regulating a remaining connection time with said WWW information is recorded on said second information storage card in addition to said URL information designating the location where the homepages are stored, reads said remaining connection time recorded on said second information storage card via said card information processing apparatus, decreases said remaining connection time by an amount corresponding to the amount of time connected to said WWW server, and updates said remaining connection time recorded on said second information storage card with the subtracted result via said card information processing apparatus.

17. An Internet accessing system in accordance with claim 13, in which said information processing apparatus, in the case where a login information necessary for displaying said WWW information is further recorded on said first information storage card, reads said login information recorded on said first information storage card via said card information processing apparatus, and transmits said login information, when said information processing apparatus receives a request for said login information for displaying said WWW information.

18. An Internet accessing system in accordance with claim 13, in which said information processing apparatus, in the case where a point information necessary for displaying said WWW information is further recorded on said second information storage card, reads said point information recorded on said second information storage card via said card information processing apparatus, processes said point information in compliance with a point request, and updates said point information recorded on said second information storage card with the processed result via said card interface portion, when said information processing apparatus receives said point request for displaying said WWW information.

19. An Internet accessing method, which employs first and second information storage cards, and which automatically originates a call to an Internet access point and connects to a WWW server, based on the information read from said first information storage card recording an Internet access point telephone number, an ID number of the card holder, and a password of the card holder, and which by accessing a WWW server, retrieves the WWW information, based on the information read from said second information storage card recording a URL information designating the location where the desired homepages are stored, and which presents said WWW information to the user.

* * * * *